Jan. 27, 1959   J. SUNNEN   2,870,528
AUTOMOTIVE VALVE TOOL
Filed March 1, 1954   2 Sheets-Sheet 1

INVENTOR
JOSEPH SUNNEN
BY George R. Ericson
ATTORNEY

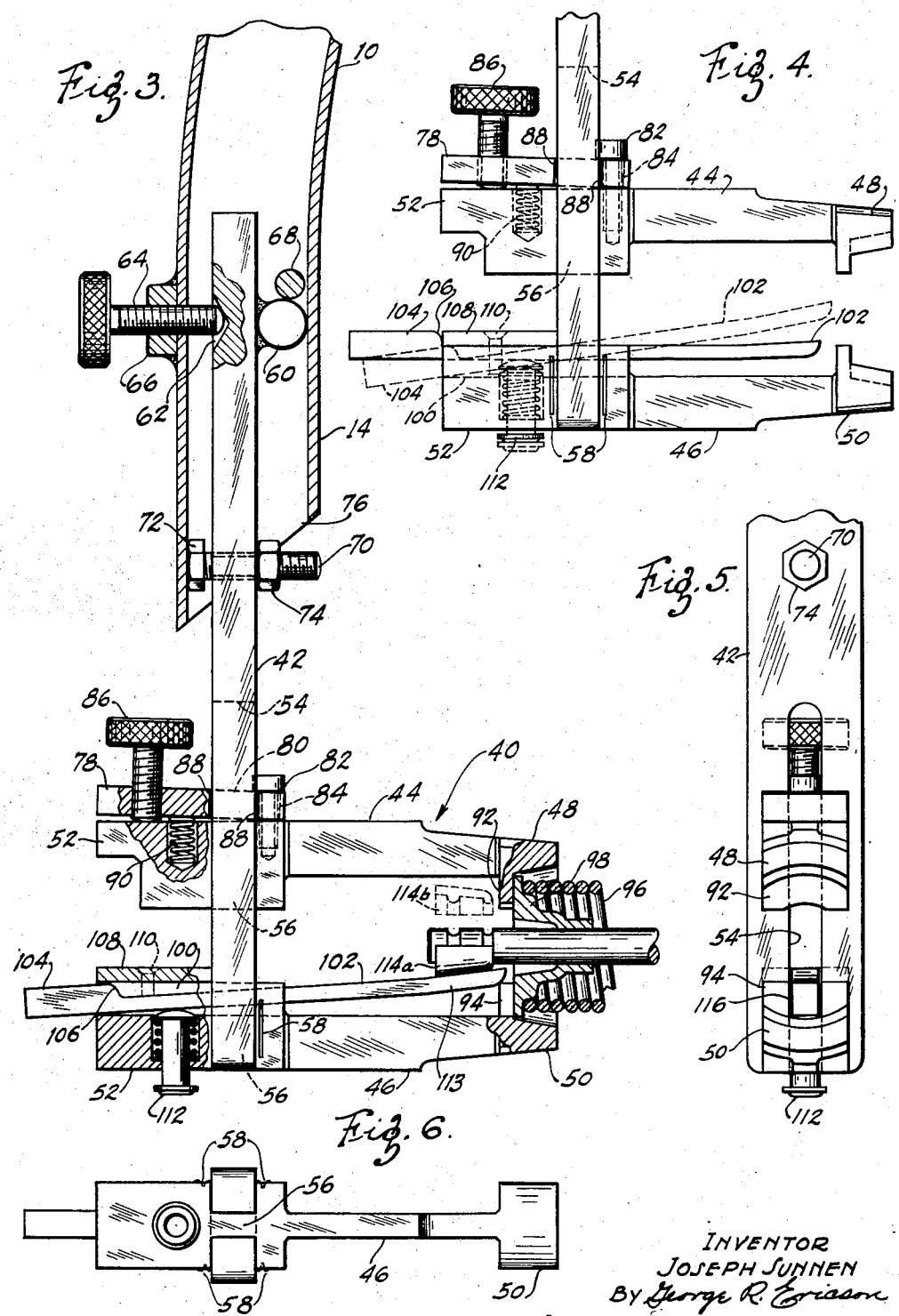

United States Patent Office 2,870,528
Patented Jan. 27, 1959

2,870,528

AUTOMOTIVE VALVE TOOL

Joseph Sunnen, Clayton, Mo.

Application March 1, 1954, Serial No. 413,403

4 Claims. (Cl. 29—219)

This invention relates to devices for compressing valve springs so as to permit the removal or insertion of the valve spring locking key. More particularly, it relates to automotive valve spring compressors of the C-frame type and to particular means carried by one leg of the frame for engaging the valve spring.

One of the objects of the invention is to provide a C-frame type valve spring compressor for removing and assembling valves in overhead valve engines, which is arranged to reach inward perpendicularly from the frame leg beyond structure ordinarily obstructing the C-frame leg so as to engage a valve spring and compress it.

A further object is to provide an automotive valve tool particularly adapted to disassemble and assemble automotive valves arranged in a horizontal or inclined position.

A further object is to provide a C-frame type valve spring compressor having a valve spring engaging device which is conveniently adjustable to receive a wide range of valve spring diameters.

A further object is to provide a valve spring compressor having novel means for retaining a valve spring locking key in position when assembling the valve.

A further object is to provide a valve spring compressor having a longitudinally slidable and laterally swinging, spring pressed finger which is movable into position for holding a valve spring locking key in place when assembling a valve and which is automatically moved out of position by engagement of the end of a valve stem when a succeeding valve spring is compressed.

These and other objects and advantages will become apparent when reading the following description in connection with the accompanying drawings.

In the drawings:

Fig. 3 is an enlarged fragmentary view showing the detachable valve spring engaging device attached to the C-frame leg and showing the locking key retaining finger in position to retain the lower half section of a split locking key, parts of the view being shown in cross-section for clearer illustration;

Fig. 4 is an enlarged fragmentary side elevation of the detachable valve spring engaging device shown detached from the frame. In this view the key retaining finger is shown in solid line in its retracted position and in dotted line in its operative position;

Fig. 5 is an enlarged fragmentary front view of the detachable valve spring engaging device; and Fig. 6 is an end view of the detachable valve spring engaging device.

Figure 1:
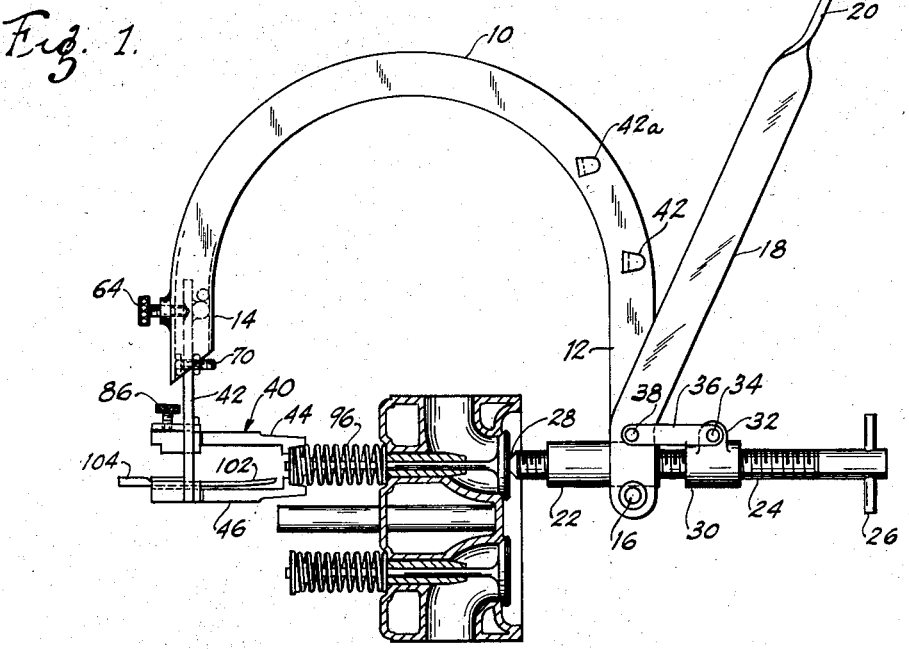
Fig. 1 is a side elevation showing the valve spring compressor according to the present invention applied to a valve assembly and adjusted to a position preparatory to compressing the valve spring.
Figure 2:
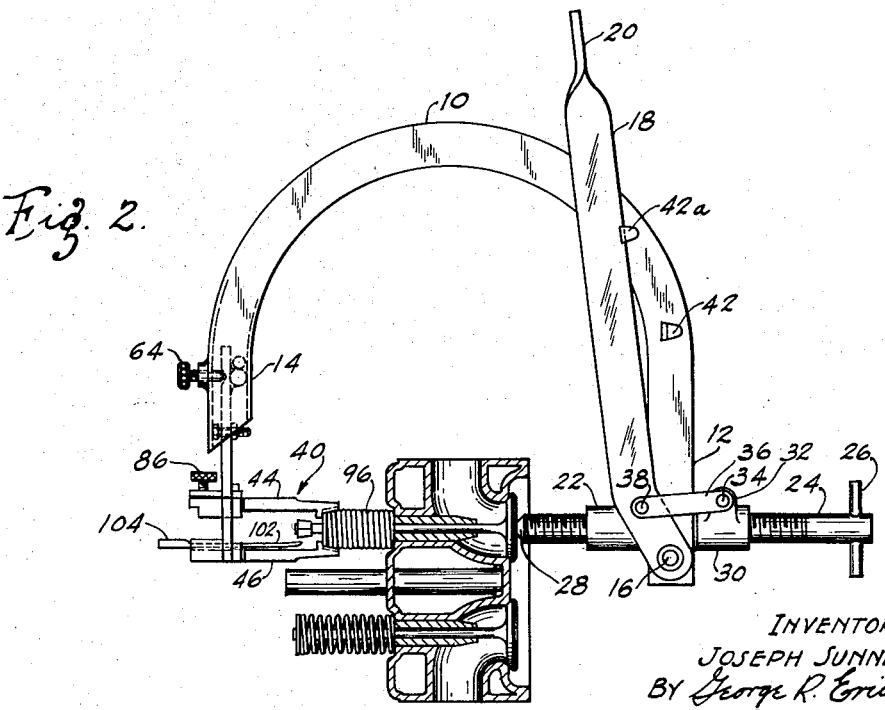
Fig. 2 is a similar view showing the valve spring compressor in the position which it assumes when fully compressing a valve spring.

Referring particularly to Figs. 1 and 2 of the drawings, the device has a C-shaped frame 10 which is formed of tubing of rectangular cross-section and has a long leg 12 and a shorter leg 14. The longer leg 12 is provided at its end with a pivot pin 16 which provides a pivotal mounting for one end of an operating lever 18. The lever 18 extends from its pivoted end to a free outer end which is twisted, as indicated at 20, to form a handle. The long leg 12 also carries a transverse tubular guide member 22 of circular cross-section which passes between the side walls of the frame leg and is rigidly fixed to the leg 12 in any suitable manner, as by welding.

Extending through the guide tube 22 is a screw 24 having an operating handle 26 at its outer end and a conical point 28 at its inner end, which point is adapted to engage the conventional conical recess provided in the head of an automotive valve. The screw 24 is of such diameter as to freely slide longitudinally in the guide sleeve 22. Threadedly engaged on the screw 24 is a collar 30 which has a laterally projecting boss 32 thereon in which is mounted a pivot pin 34 for pivoting one end of a link 36. The other end of link 36 is pivotally connected to the lever 18 by a pivot 38 which is fixed in the lever. By this arrangement a leftward movement of the outer end of lever 18 causes a leftward movement of the screw 24 with respect to the frame leg 12. Projecting from the side face of the frame are two hook-like keepers 42 and 42a which have a purpose to be described later.

Projecting from the shorter leg 14 of the C-frame is a detachably mounted valve spring engaging device, generally indicated at 40. The device 40 includes an arm 42 having an inner end which is entered into the tubular leg 14 and having an outer end which carries a pair of laterally extending members 44 and 46. The members 44 and 46 are provided at one end with cooperating, arcuate, valve spring receiving elements 48 and 50 and at their other end with enlarged base portions 52. The arm 42 is provided with a longitudinal slot 54 extending inwardly from its outer end, into which slot are slidably fitted reduced portions 56 of the base sections 52 of the members 44 and 46. While the member 44 is free to slide in the slot 54, the member 46 on the other hand is rigidly anchored in the slot at the outer end of the arm by any suitable means, such as by staking, so as to displace the metal of the adjacent shoulders as indicated at 58.

At its inner end, the arm 42 carries a transverse cylindrical block 60 which is attached to one side of the arm in any suitable manner, such as by welding as indicated, and in the opposite side of the arm substantially in line with block 60 is a conical recess 62. The tubular frame leg 14 carries a thumbscrew 64 threadedly engaged in one wall thereof and in a reinforcing block 66 which is attached to the wall. The screw 64 has a rounded end which engages the arm 42 in the recess 62, thereby to force the cylindrical block 60 against the opposite wall of the frame tube. Mounted in the adjacent side walls of the frame leg 14 is a pin 68 which limits longitudinal inward movement of the arm 42 due to the engagement of the block 60 therewith, and the relative positions of the center line of screw 64 and the center line of conical recess 62 are such when the block 60 is bearing against the frame wall and against the pin 68 that the rounded end of screw 64 bears against only the upper inclined side of the conical recess 62, as indicated, so as to effect a force component acting to hold the arm 42 inwardly against pin 68.

It will be seen that the foregoing arrangement provides a conveniently detachable connection of the valve spring engaging device to the frame leg 14 and also permits a limited rotation of the arm 42 so that the laterally extending members 44 and 46 may be properly aligned with the valve head engaging screw 24. Threadedly engaged in the arm 42 at an intermediate point is an adjustment screw 70 having a head 72 which bears against a wall of the frame 10 so as to limit the clockwise rotation of the device to an adjusted position wherein the perpendicular members 44 and 46 are in alignment with screw 24. The screw 70 is provided with a lock nut 74 and the end of the frame leg 14 is cut off at a suitable angle, as indicated at 76, to provide access to the adjusting screw and to provide a ledge on which the head of the screw bears.

The freely slidable valve spring engaging member 44 is provided with a locking plate 78 for locking it in an adjusted position with relation to its fixed companion member 46. The locking plate 78 is of the same width as the base portion 52 of the member 44 and has a reduced portion 80 which slidably fits the slot 54. One end of the plate 78 is pivotally attached to the base portion of the member 44 by a screw 82, which screw is threadedly engaged and bottomed in the base portion 52. This pivotal attachment is accomplished by providing a clearance hole 84 in the plate 78 for the screw 82 which is sufficiently larger than the screw to permit the plate to be tilted slightly. Near its other end, the plate 78 carries a locking thumbscrew 86 threadedly engaged therein and which bears at its end against the base portion 52 to cause the plate to be tilted as the screw is adjusted inwardly. As the plate 78 is tilted, the opposite upper and lower edges of the shoulders 88 formed by the reduction in width at 80 bear against the arm 42 to lock the member 44 in adjusted position. A spring 90 seated in a cavity in the base portion 52 normally urges the plate 78 toward a tilted position so that, with the locking screw 86 backed out, the member 44 may be conveniently adjusted along the arm 42 by pressing downwardly with the thumb on the free end of the plate 78, and so that it will be retained in this adjusted position when pressure of the thumb on the plate is released. After the member 44 is properly adjusted, the thumbscrew 82 is tightened and the member 44 is thereby securely locked in an adjusted position.

The valve receiving elements 48 and 50 at the outer ends of members 44 and 46 have arcuate side walls and flat, platform portions 92 and 94 respectively and cooperate to provide opposed cup segments which receive an automotive valve spring 96 and its retaining cup 98. It is to be noted that the valve spring receiving segments with their arcuate side walls are diametrically opposed in a plane parallel to the C-frame. This is of importance because any substantial flexing of the C-frame under an unusual stress, as when breaking loose a tight or sticking valve assembly, results in a spreading of the frame legs and an outward tilting of the valve spring engaging device in the same plane, a condition which tends to cause the valve spring to slip off. The disposition of the members 44 and 46 and the side walls of their spring receiving elements provides a positive stop against this accident.

Slidably arranged in a slot 100 in the base portion 52 of member 46 is a finger 102 which co-extends generally with member 46 along its inner side. The finger 102 has a portion 104 of increased thickness at one end thereof which provides a handle having a rounded shoulder 106 at its inner end. A cover plate 108 attached to the base portion 52 of member 46 by screws 110 retains the finger 102 in the slot 100. The finger 102 is normally urged upward against the cover plate 108 by a spring pressed pin 112 which bears at its upper end against the under side of the finger at a point thereon adjacent to its handle. Fig. 4 shows the finger 102 in full line in a retracted position with the thicker handle portion 104 extending entirely outward of the slot 100. When it is in this position the finger is pressed flat against the cover plate 108 and it lies substantially parallel with member 46. When the handle portion 104 is pressed downwardly and inwardly so as to be partially within the slot 100, the finger will assume the position shown in dotted line in Fig. 4. It is to be understood that the depth of the slot 100 is slightly greater than the thickness of the handle portion 104 so as to permit the finger to pivot in a counterclockwise direction about the rounded shoulder 106 under the pressure of the spring loaded pin 112.

The other end of the finger 102 has a short portion 113 which is formed at a slight angle to the major portion of the finger so as to accommodate the tapered outer surface of a conventional two-piece, valve spring locking key. The two-piece locking key illustrated is a widely used conventional locking key having internal annular ribs which interfit with annular grooves in the valve stem near its end, as indicated in Fig. 3. The key also has a tapered external surface which interfits in a tapered recess in the spring retaining cup 98, whereby it is held in assembled relationship on the valve stem. In Fig. 3, one section of the locking key 114a is shown in full line in an assembled position on the valve stem, and the other half section 114b is shown in dotted line in a position removed laterally from the stem. It is to be understood that the free end of the finger 102 may be formed in any desired manner so as to accommodate valve spring locking keys of various shapes so that substantial surface contact between the finger and locking key is achieved. The platform portion 94 of the valve spring receiving element 50 is slotted, as indicated at 116 in Fig. 5, so as to permit the formed end of finger 102 to be pressed inwardly toward member 46 when in its extended operative position.

In operation

The device is shown operatively associated with the detached cylindrical head of a valve in head type automotive engine with the cylindrical head placed in a position so that the valves are lying substantially horizontally. When it is desired to remove the valves from the head, the valve spring compressor is placed on the valve assembly in the position shown in Fig. 1, with the operating handle 18 in the position shown. The member 44 is then slidably adjusted along the arm 42 to accommodate the diameter of the spring and retainer cup. After being properly adjusted, it is then locked in adjusted position by tightening locking screw 86. With the valve spring properly seated in the spring receiving elements 48 and 50, the screw 24 is adjusted inwardly until its pointed end 28 is seated in the valve head recess. The entire valve spring engaging device is now adjusted by rotating the arm 42 about the element 60 so that the center point between valve receiving elements 48 and 50 substantially coincides with the center line of the screw 24 and the valve. This adjustment is accomplished by loosening lock nut 74 on screw 70 and then rotating the screw 70 in one direction or the other. This adjustment being properly made, the lock nut 70 is tightened, and the operator then compresses the valve spring sufficiently to expose the locking keys 114 to access for disassembly by pressing the operating lever 18 toward the left to the position shown in Fig. 2.

Quite often, the locking keys 114 and the spring retaining cup 98 are corroded and stuck together or stuck to the valve stem, thus requiring something more than the force which can be applied by lever 18 to break them loose. In these cases, the lever 18 is forced part way toward the left and latched under the keeper 42. With the C-frame thus under stress, the outer end of screw 24 is struck sharp blows to dislodge the sticking valve spring members. When the valve spring is freed, the lever 18 is then moved further to the left to compress the spring sufficiently to completely expose the spring locking keys so as to permit their removal. After the locking keys are removed, the lever 18 is then released and the valve spring compressor is removed and the valve and spring disassembled.

When it is desired to reassemble a valve and spring, the spring compressor is again placed over the assembly as in Fig. 1, the proper adjustment of the screw 24 and the valve spring engaging device 40 having been once made, all of the valves of the engine may then be disassembled or assembled without any further adjustments. With the spring compressor in position over the assembled valve, valve spring, and spring retainer cup, the lever 18 is now moved all the way to the left and latched under the keeper 42a as indicated in Fig. 2. In this position the end of the valve stem projects sufficiently from the retainer cup 98 to permit assembly of the split locking keys.

The handle 104 of finger 102 is now pressed downward and inward so that it assumes the position shown in dotted line in Fig. 4. The free end of finger 102 is then pressed toward the member 46 and one half section of the locking key is placed in position on the under side of the valve stem and the finger is then released so that it holds this key section in position on the valve stem, in a manner as indicated in Fig. 3. The other half section of the key 114b is then placed in position on the upper side of the valve stem, this section being on top will, of course, remain in place. The lever 18 is now released from the keeper 42a and permitted to return to the released position of Fig. 1. Both hands are free to accomplish this, one hand being necessary to steady the device in position on the valve assembly while the other hand releases the operating handle. When positioning the device for disassembling the next valve spring, the free end of finger 102 will lie in the path of the valve stem as this succeeding valve spring is compressed, and as a result, the finger will be engaged by the end of the valve stem and pushed outward to its inoperative position.

While the automotive valves illustrated are shown arranged in a horizontal position, it is understood that the valves are often arranged at an angle to each other in valve in head type engines so that the valve will not always lie in a horizontal position when the detached cylinder head is rested on its side on a work bench. The method and means described for holding the key sections in place will, however, operate satisfactorily in substantially all arrangements up to 45° of angle to the horizontal. It is to be further understood that while only a single spring pressed key retaining means associated with member 46 is illustrated, a second similar means may also be associated with the other member 44 so as to retain both key sections in assembled positions when the valve assembly to be worked on is arranged in a vertical position.

By providing members 44 and 46 of substantial length as shown, the device is capable of reaching and compressing valve springs which in overhead valve engines would otherwise be frequently inaccessible due to adjacent projecting structure. It will be appreciated, however, that this projection of the point of contact with the valve spring from arm 42 along a line perpendicular to the arm for the purpose of reaching inaccessible valve springs effects a multiplication of any distortion from parallelism of the frame legs when the device is unduly stressed because of sticky valve springs, and that the resulting misalignment of the spring engaging members 44 and 46 with the valve stem and valve head engaging screw 24 will increase the tendency of the device to slip off of the valve spring in the plane of the C-frame when under such undue stress. On the other hand this hazard is precluded in the present invention by spacing the spring engaging elements on arm 42 in the plane of the C-frame and by providing them with side walls which embrace diametrically opposed portions of the end of a valve spring, which portions lie in the plane of the C-frame.

The foregoing description is intended to be illustrative and not limiting, the scope of the invention being set forth in the appended claims.

I claim:

1. In a device of the kind described, a C-frame having a long leg and a short leg, a valve head engaging member slidably mounted on the end of the long leg of the frame for transverse movement in the plane of the frame, and an operating lever pivotally connected to the frame and the member for moving it, an arm pivotally mounted at one end on the short leg of the frame and extending outwardly therefrom and arranged for limited rotational adjustment in the plane of the frame, a pair of elongated valve spring engaging members connected at one end to the free end of said arm and extending perpendicularly of the arm toward said valve head engaging member, one of said elongated members being fixed on said arm and the other being slidably adjustable thereon, spring pressed means for restraining said slidably mounted member in adjusted position on said arm, and screw threaded means for locking said spring pressed means in an adjusted position, said elongated members each having a perpendicular valve spring receiving abutment at its free end for engaging a valve spring retaining cup at diametrically opposed peripheral portions thereof lying in the plane of the frame, and spring pressed means carried by at least one of said elongated members and acting transversely toward the other of said elongated members so as to bear yieldably against a valve spring locking key on the exposed portion of the valve stem when the valve spring is compressed, thereby to yieldably hold a locking key in place against the valve stem.

2. In an automotive valve spring compressor for removing and assembling valves in overhead valve engines, a flat C-frame, a valve head engaging element slidably mounted near the end of one of the legs of the C-frame for movement toward the other leg of the C-frame, an operating lever pivotally connected to said first-mentioned C-frame leg and to said valve head engaging element for moving it toward and away from said other frame leg, and valve spring engaging means comprising a pair of elongated valve spring engaging members supported at one end on said other C-frame leg, said valve spring engaging members being spaced longitudinally on said other frame leg and extending perpendicularly therefrom toward said valve head engaging element, thereby to reach perpendicularly from said other frame leg to engage the end of a valve spring lying inwardly beyond structure which would limit the inward movement of said other frame leg toward the end of a valve spring, said elongated valve spring engaging members each having a lateral shelf thereon spaced inwardly from its outer end, said shelves extending from the adjacent sides of said members for abutting diametrically opposed portions of the end of a valve spring between them, and the portions of said members between said shelves and their outer ends being arranged to embrace opposite side portions of the valve spring near its end, whereby the end of a valve spring and the ends of said valve engaging members are restrained against relative lateral movement in the plane of the C-frame.

3. In an automotive valve spring compressor for overhead valves, a flat C-frame having a long leg and a short leg, a valve head engaging element slidably mounted transversely in the long leg of the frame for movement in the plane of the frame, an operating handle pivotally connected to said frame and to said valve head engaging element for moving it toward and away from said short leg, and valve spring engaging means supported by said short frame leg, said valve spring engaging an arm being detachably connected at one end to the end of said short frame leg and extending longitudinally therefrom, a pair of elongated valve spring engaging members attached at one end to said arm and arranged longitudinally thereon in spaced relationship and extending perpendicularly from said arm toward said valve head engaging element, said elongated members each having a lateral shelf thereon spaced from its free end, which shelves extend from the adjacent sides of said members and are adapted to abut diametrically opposite portions of the end of a valve spring between said members, the portions of said elongated members between said shelves and their ends being arranged to embrace the sides of the valve spring near its end, thereby to prevent the relative lateral movement of the free ends of said members and the end of the valve spring in the plane of the C-frame, one of said elongated spring engaging members being mounted on said arm for slidable movement therealong, spring pressed means for releasably holding said slidably mounted member in an adjusted position on said arm, and screw threaded means for locking said slidably mounted member in an adjusted position on said arm.

4. An automotive valve spring compressor as set forth in claim 3 in which said arm is pivotally mounted at one end on the end of said short frame leg for limited swinging motion in the plane of the C-frame and in which screw threaded means is provided for adjustably positioning said arm with respect to parallelism with said C-frame legs.

References Cited in the file of this patent

UNITED STATES PATENTS

| | | |
|---|---|---|
| 1,621,237 | Davis | Mar. 15, 1927 |
| 1,738,178 | Fix | Dec. 3, 1929 |
| 2,004,590 | Sunnen | June 11, 1935 |
| 2,523,069 | Slack | Sept. 19, 1950 |
| 2,691,210 | Sunnen | Oct. 12, 1954 |